US007553552B2

United States Patent
Oba et al.

(12) United States Patent
(10) Patent No.: US 7,553,552 B2
(45) Date of Patent: Jun. 30, 2009

(54) ORNAMENT

(75) Inventors: Tatsuya Oba, Aichi-ken (JP); Tetsuya Fujii, Aichi-ken (JP); Chiharu Totani, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/594,984

(22) Filed: Nov. 9, 2006

(65) Prior Publication Data
US 2007/0104897 A1 May 10, 2007

(30) Foreign Application Priority Data
Nov. 10, 2005 (JP) ............................. 2005-326053

(51) Int. Cl.
*B32B 15/08* (2006.01)

(52) U.S. Cl. .................... 428/626; 428/461; 428/542.6; 428/31; 296/193.1

(58) Field of Classification Search ................ 428/500, 428/461, 542.2, 542.6; 165/98, 99; 237/45; 296/193.1
See application file for complete search history.

(56) References Cited

U.S. PATENT DOCUMENTS 5,837,354 A * 11/1998 Ogisu et al. ................. 428/208

| | | | |
|---|---|---|---|
| 6,197,428 B1 * | 3/2001 | Rogers | 428/446 |
| 6,391,400 B1 * | 5/2002 | Russell et al. | 428/34 |
| 6,565,982 B1 * | 5/2003 | Ouderkirk et al. | 428/457 |

FOREIGN PATENT DOCUMENTS

| JP | U-61-98651 | | 6/1986 |
|---|---|---|---|
| JP | 62-143846 | * | 6/1987 |
| JP | U-1-80561 | | 5/1989 |
| JP | U-3026868 | | 5/1996 |

* cited by examiner

*Primary Examiner*—John J. Zimmerman
*Assistant Examiner*—Aaron Austin
(74) *Attorney, Agent, or Firm*—Posz Law Group, PLC

(57) ABSTRACT

A radiator grille, or ornament, includes a base material which transmits visible light and is made of an acrylic resin, a first ornamental layer coating the front surface of the base material, and a second ornamental layer coating the rear surface of the base material. The first and second ornamental layers each transmit visible light and have a thickness that is less than the wavelength of the visible light. It is preferred that the first ornamental layer and the second ornamental layer differ from each other in at least one of material, number of layers, thickness, refractive index of visible light, reflectance of visible light, absorptivity of visible light, and transmittance of visible light. The first ornamental layer is a hard coating layer, and the second ornamental layer is a hard coating layer or vapor deposition layer.

18 Claims, 1 Drawing Sheet

ORNAMENT

BACKGROUND OF THE INVENTION

The present invention relates to an ornament attached to a vehicle, and more particularly, to a transparent ornament, such as a radiator grille, having a clear metallic gloss.

Japanese Utility Model No. 3026868 discloses a radiator grille that gives off a metallic gloss in the daytime and emits light in the nighttime. This light-emitting radiator grille includes a radiator grille body made of a transparent polycarbonate resin. Vapor deposition is performed to form a thin film of aluminum on an inner surface of the radiator grille. In a bright location, the radiator grille gives off a metallic gloss due to the aluminum film. In a dark location, light entering the side surface or rear surface of the radiator grilles causes light to be emitted partially or entirely from the surface of the radiator grille.

Japanese Laid-Open Utility Model Publication No. 61-98651 discloses an ornamental finisher including a lens made of a synthetic resin and a light shield arranged on a rear surface of the lens. The finisher is arranged near a vehicle lamp and has a clear ornamental portion arranged between the lens and the light shield. The clear ornamental portion has a refractive index differing from that of the lens. This results in double refraction that occurs when looking at the lens from the outer side. Accordingly, the finisher defines a prism at the rear surface of the lens and achieves the same prismatic function as a lamp. This improves the ornamental effects.

Japanese Laid-Open Utility Model Publication No. 1-80561 discloses a radiator grille structure in which a radiator grille is at least partially formed from a transparent resin. A plurality of convex lens cuts extending parallel to the lateral direction of the vehicle is formed in the rear surface of the radiator grille. In the radiator grille, a rib is formed integrally in recesses defined between the convex lens cuts. Thus, light is refracted in a complicated manner in the transparent resin portion. This makes the radiator grille look bright and three-dimensional.

When looking at the light emitting radiator grille of Japanese Utility Model No. 3026868 in a bright location, due to the excessively high transparency of the radiator grille body, the metallic gloss of the radiator grille body cannot be sufficiently seen. Further, since the transparency of the overall radiator grille is too high, structures behind the radiator grille body can be seen through the radiator grille when there is a large amount of ambient light. Such structures include parts such as the horn or the radiator, which forms the engine cooling system. When structures in the engine room can be seen through the radiator grille, the aesthetic appeal of the vehicle is reduced.

The ornamental finisher of Japanese Laid-Open Utility Model Publication No. 61-98651 has the light shield arranged on the rear surface of the lens. Thus, ambient light is not transmitted to the rear side of the lens. However, the finisher does not have sufficient transparency. Further, with the radiator grille of Japanese Laid-Open Utility Model Publication No. 1-80561, the radiator grille has increased brightness and three-dimensionality. However, the complicated refraction of ambient light results in insufficient transparency of the finisher.

Accordingly, there is a demand for an ornament having appropriate transparency, while giving off a strong metallic gloss and making it difficult to see structures behind the ornament.

SUMMARY OF THE INVENTION

It is an object of the present invention to provide an ornament having appropriate transparency, while giving off a strong metallic gloss and making it difficult to see structures behind the rear side of the ornament.

One aspect of the present invention is an ornament including a base material which transmits visible light and is made of a synthetic resin. A first ornamental layer coats a front surface of the base material. A second ornamental layer coats a rear surface of the base material. The first and second ornamental layers each transmit visible light and have a thickness less than the wavelength of visible light.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A radiator grille according to a preferred embodiment of the present invention will now be described with reference to the drawings.

Figure 1A:
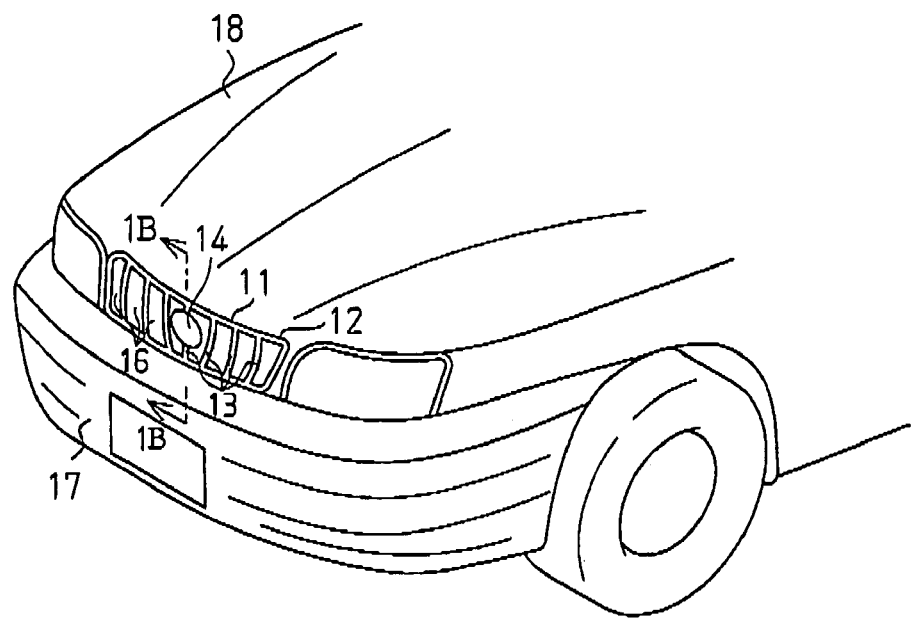
FIG. 1A is a perspective view showing the front side of a vehicle.
Figure 1B:
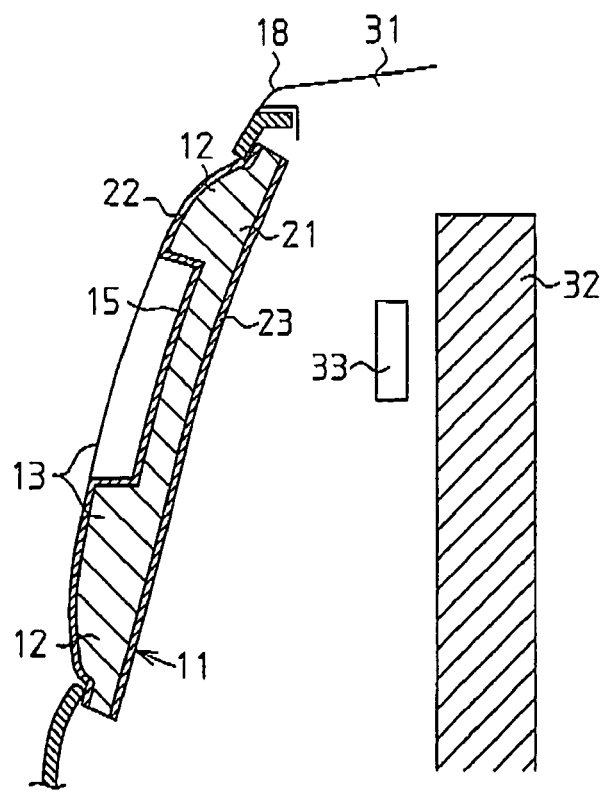
FIG. 1B is a cross-sectional view taken along line 1B-1B in FIG. 1A.

As shown in FIG. 1A, a radiator grille 11 is attached to a front side of a vehicle. The radiator grille 11 includes a rectangular outer frame 12 elongated in the lateral direction and a plurality of vertical bars 13 connecting the upper and lower sides of the outer frame 12. As shown in FIGS. 1A and 1B, the vertical bar 13 located in the middle of the radiator grille 11 includes a recess 15 for receiving an emblem 14, which is an elliptic plate. The emblem 14 is not shown in FIG. 1B.

In the radiator grille 11, a plurality of slits 16 are defined between the two sides and vertical bars 13 of the outer frame 12. Further, the radiator grille 11 is streamlined and extends from a front bumper 17 of the vehicle to a hood 18 of the vehicle. The streamlined form of the radiator grille 11 makes the vehicle look sporty and luxurious. The front side of the vehicle around the radiator grille 11 is the portion that gives a strong impression of the vehicle. In other words, the front side of the vehicle corresponds to the face of a person and is an extremely important portion that distinguishes the vehicle from other vehicles.

Referring to FIG. 1B, the radiator grille 11 includes a base material 21, which is made of an acrylic resin. The base material 21 is shaped in correspondence with the outer surface of the radiator grille 11. The base material 21 is injection molded and made of a colored or achromatic and transparent acrylic resin, which transmits visible light. The base material 21 includes a thick portion and has a hollow structure. The acrylic resin is a material with superior light resistance and weather resistance and has a high refractive index. Visible light normally refers to light having a wavelength of 400 to 800 nm, and the transmission of visible light refers to the transmission of light having a wavelength of 400 to 800 nm.

As shown in FIG. 1B, the radiator grille 11 has a front surface (ornamental surface) coated by a first ornamental layer 22 and a rear surface coated by a second ornamental layer 23. The first and second ornamental layers 22 and 23 are each formed by a known film application method or vapor deposition method and each transmit visible light.

The first and second ornamental layers 22 and 23 each have a thickness that is less than the wavelength of visible light, that is, less than 800 nm. Preferably, the first and second ornamental layers 22 and 23 each have a thickness of 50 to 200 nm. When the first and second ornamental layers 22 and 23 are irradiated with visible light, the visible light is subjected to at least one optical effect selected from refraction, reflection, and interference. This gives the radiator grille 11 a metallic gloss.

The first ornamental layer 22 is a hard coating layer applied to the front surface of the base material 21. The second ornamental layer 23 is a hard coating layer applied to the rear surface of the base material 21 or a vapor deposition layer formed by performing vapor deposition on the rear surface of the base material 21. To increase the transparency of the radiator grille 11 when viewed from the front surface, it is preferred that the radiator grille 11 have a lower light transmittance than the second ornamental layer 23 with respect to visible light. Each of the ornamental layers 22 and 23 may be formed by a single layer or multiple layers. If necessary, the hard coating layer and vapor deposition may be colored within a range in which visible light is transmittable.

It is preferred that the first ornamental layer 22 and the second ornamental layer 23 differ from each other in at least one of material, number of layers, thickness, refractive index of visible light, reflectance of visible light, absorptivity of visible light, and transmittance of visible light. In this case, the first ornamental layer 22 has a first optical effect, and the second ornamental layer 23 has a second optical effect that completely differs from the first optical effect. Thus, when the front surface of the radiator grille 11 is irradiated with visible light, the visible light is influenced by the first optical effect of the first ornamental layer 22 and by the second optical effect of the second ornamental layer 23. As a result, the front surface of the radiator grille 11 is viewed as having a heavy metallic gloss influenced by different types of optical effects.

The hard coating layer is formed by applying a known surface treatment agent used for plastics. Examples of a surface treatment agent include acrylate, oxetane, silicone organic hard coating agents, inorganic hard coating agents, and organic and inorganic hybrid hard coating agents. The hard coating agent prevents the front surface of the base material 21 from being damaged or stained. Further, the hard coating agent improves light resistance and weather resistance and makes the base material 21 water-repellant.

Examples of a vapor deposition layer include a multilayered vapor deposition layer formed by performing dichroic vapor deposition and a half mirror vapor deposition layer formed by performing titanium half vapor deposition and aluminum half deposition. The dichroic vapor deposition vapor deposits a plurality of metals, such as silicon oxide and titanium oxide, to form a superimposition of thin films. The vapor deposition gives the base material 21 a metallic gloss including rainbow colors. The half mirror vapor deposition layer transmits some of the visible light and reflects the remaining visible light.

The operation of the radiator grille 11 will now be discussed.

As shown in FIGS. 1A and 1B, the radiator grille 11 is attached in front of an engine room 31, that is, on the front end of the vehicle. The engine room 31 includes a radiator 32 forming an engine cooling system, a radiator support (not shown) for supporting the radiator 32 on the vehicle, and a horn 33 arranged between the radiator 32 and the radiator grille 11.

When looking at the front end of the vehicle in a bright location, the radiator grille 11 of the present embodiment gives off a metallic gloss having an appropriate transparency. Further, it is difficult to see structures, such as the radiator 32 and the horn 33, through the radiator grilles 11. Therefore, the important portion of the vehicle that corresponds to a person's face may be provided with a luxurious aesthetic appeal. The first ornamental layer 22 applied to the front surface of the base material 21 and the second ornamental layer 23 applied to the rear surface of the base material 21 give the radiator grille 11 a metallic gloss with an appropriate transparency.

The base material 21 and the two ornamental layers 22 and 23 each transmit visible light. Thus, the radiator grille 11 is transparent like glass. Further, the ornamental layers 22 and 23 each have a thickness that is less than the wavelength of visible light. The visible light irradiating the front surface of the radiator grille 11 is influenced in the first and second ornamental layers 22 and 23 by at least one of the optical effects of refraction, reflection, and interference. As a result, when looking at the front surface of the radiator grille 11, a clear metallic gloss may be viewed due to the optical effects. Further, the metallic gloss is influenced by the two optical effects of the ornamental layers 22 and 23 on the front and rear surfaces of the base material 21. This prevents structures behind the radiator grille 11 from being seen through the radiator grille 11. Accordingly, the radiator grille 11 gives off a metallic gloss having an appropriate transparency, and structures behind the radiator grille 11 cannot be easily seen.

In the radiator grille 11 of the present embodiment, the first optical effect of the first ornamental layer 22 and the second optical effect of the second ornamental layer 23 are not completely the same. Thus, the visible light irradiating the front surface of the radiator grille 11 is influenced by the first optical effect of the first ornamental layer 22 and the second optical effect of the second ornamental layer 23. As a result, light influenced by different types of optical effects is visible on the front surface of the radiator grille 11. In this case, the levels of the first and second optical effects are extremely low and are each less than the wavelength level of visible light. This maintains the original transparency of the radiator grille 11. Accordingly, while maintaining appropriate transparency, the three-dimensional and heavy metallic gloss makes it further difficult to see structures behind the radiator grille 11.

Referring to table 1 shown below, the inventors of the present invention have manufactured radiator grilles 11 for examples 1 to 6 and a radiator grille for comparative example 1. The refractive index of light and the Abbe constant were obtained under sunlight for each radiator grille 11. The Abbe constant is an inversed dispersion rate of light (inverse of dispersion rate of light) and indicates the degree of color aberration resulting from the dispersion of light. Thus, the color aberration increases as the Abbe constant decreases and makes it difficult to see structures behind the radiator grille 11 when looking at the front surface of the radiator grille 11. In the preferred embodiment of the radiator grille 11, the Abbe constant is preferably 60 or less, more preferably 55 or less, and most preferably, about 43. It is not preferable that the Abbe constant exceed 60 since the transparency of the radiator grille 11 would become too high and cause the structures behind the radiator grille 11 to become visible.

In examples 1 to 6 and the comparative example 1, the base material 21 is formed from the same material (achromatic and transparent poly(methylmethacrylate)resin) with the same shape. The second ornamental layer 23 of example 1 is formed by alternately superimposing titanium oxide ($TiO_2$) layers and silicon oxide ($SiO_2$) layers into eleven layers, while exposing a silicon oxide layer from the rear side of the radiator grille 11. The second ornamental layer 23 of example 2 is formed by alternately superimposing titanium oxide layers and silicon oxide layers into seven layers, while exposing a silicon oxide layer from the rear side of the radiator grille 11. In examples 1 to 4, the thickness of each second ornamental layer 23 is set within the range of 50 to 200 nm.

|  | First Ornamental Layer | Second Ornamental Layer | Refractive Index | Abbe Constant |
|---|---|---|---|---|
| Example 1 | Hard Coating Layer (achromatic, transparent) | Dichroic Vapor Deposition Layer (blue) | 1.498 | 55 |
| Example 2 | Hard Coating Layer (achromatic, transparent) | Dichroic Vapor Deposition Layer (light blue) | 1.496 | 55 |
| Example 3 | Hard Coating Layer (achromatic, transparent) | Titanium Half Vapor Deposition Layer | 1.498 | 55 |
| Example 4 | Hard Coating Layer (achromatic, transparent) | Aluminum Half Vapor Deposition Layer | 1.493 | 51 |
| Example 5 | Hard Coating Layer (blue) | Hard Coating Layer (blue) | 1.490 | 59 |
| Example 6 | Hard Coating Layer (gray) | Hard Coating Layer (gray) | 1.493 | 58 |
| Comparative Example 1 | None | None | 1.491 | 61 |

As shown in table 1, the application of the first ornamental layer 22 and the second ornamental layer 23 to the radiator grille 11 enables the Abbe constant to be set within a preferable range. Further, it is apparent that the second ornamental layer 23 be a vapor deposition layer rather than a hard coating layer.

The present embodiment has the advantages described below.

(1) The radiator grille 11 includes the synthetic resin base material 21 that transmits visible light. The front and rear surfaces of the base material 21 are respectively coated with the first and second ornamental layers 22 and 23. In this case, the base material 21 and the two ornamental layers 22 and 23 each transmit visible light. Thus, the radiator grille 11 has transparency. Further, the first and second ornamental layers 22 and 23 each have a thickness that is less than the wavelength of visible light. Thus, due to the ornamental layers 22 and 23, the visible light irradiating the front surface of the radiator grille 11 is influenced by at least one optical effect of refraction, reflection, and interference. As a result, when looking at the front surface of the radiator grille 11 that is irradiated with visible light, the radiator grille 11 has a clear metallic gloss resulting from the optical effects. Further, the metallic gloss is influenced by the two optical effects of the two ornamental layers 22 and 23 coating the front and rear surfaces of the base material 21. This prevents structures behind the radiator grille 11 from being seen through the radiator grille 11. Accordingly, when looking at the radiator grille 11 from the front surface (ornamental surface), the radiator grille 11 gives off a metallic gloss having an appropriate transparency and structures behind the radiator grille 11 is difficult to see.

(2) The first ornamental layer 22 and the second ornamental layer 23 differ from each other in at least one of material, number of layers, thickness, refractive index of visible light, reflectance of visible light, absorptivity of visible light, and transmittance of visible light. Thus, the first optical effect of the first ornamental layer 22 completely differs from the second optical effect of the second ornamental layer 23. Further, when the front surface of the radiator grille 11 is irradiated with visible light, the visible light is influenced by the first optical effect of the first ornamental layer 22 and by the second optical effect of the second ornamental layer 23. As a result, the front surface of the radiator grille 11 is viewed as having a heavy metallic gloss influenced by different types of optical effects. In this case, the levels of the first and second optical effects are each less than the wavelength level of visible light. This maintains the original transparency of the radiator grille 11. Accordingly, while maintaining appropriate transparency of the radiator grille 11, the three-dimensional and heavy metallic gloss makes it further difficult to see structures behind the radiator grille 11.

(3) Structures, such as the horn 33 and the radiator 32 forming the engine cooling system, are arranged behind the radiator grille 11. The radiator grille 11 has transparency that improves its aesthetic appeal. This may result in concerns in which the structures may be seen from the outer side of the vehicle and reduce the aesthetic appeal of the vehicle. However, the radiator grille 11 of the present embodiment makes it difficult for structures behind the radiator grille 11 to be seen through the radiator grille 11 due to the metallic gloss. Further, the metallic gloss with the appropriate transparency drastically improves the aesthetic appeal of the vehicle.

It should be apparent to those skilled in the art that the present invention may be embodied in many other specific forms without departing from the spirit or scope of the invention. Particularly, it should be understood that the present invention may be embodied in the following forms.

To increase the adhesion of the base material 21 with the hard coating layer or the vapor deposition layer, an undercoating layer that transmits visible light may be arranged between the base material 21 and the hard coating layer or vapor deposition layer.

The first ornamental layer 22 may be formed by superimposing a vapor deposition layer and a hard coating layer. In this case, it is preferred that the hard coating layer be exposed from the front surface of the radiator grille 11. In the same manner, the second ornamental layer 23 may be formed by superimposing a vapor deposition layer and a hard coating layer.

In addition to the radiator grille 11, the ornament may be any component attached to the outer side of a vehicle, such as a rear door garnish, a side protection mould, a roof spoiler, a wheel cap, a mud guard, a front spoiler, a rear bumper spoiler, a side mud guard, or an outer side lever. The ornament may also be a component arranged inside a vehicle.

The present examples and embodiments are to be considered as illustrative and not restrictive, and the invention is not to be limited to the details given herein, but may be modified within the scope and equivalence of the appended claims.

The invention claimed is:

1. An ornament, which is a component attached to the outer side of a vehicle and which inhibits viewing of structures behind the ornament from in front of the ornament, the ornament comprising:
 a base material which transmits visible light and is made of a synthetic resin;
 a first ornamental layer coating a front surface of the base material; and
 a second ornamental layer coating a rear surface of the base material, wherein
 the first and second ornamental layers each transmit visible light and have a thickness less than 800 nm,
 the second ornamental layer is formed by a dichroic vapor deposition or half mirror vapor deposition,
 an Abbe constant of the ornament is 60 or less, and
 the Abbe constant indicates the degree of color aberration resulting from the dispersion of light.

2. The ornament according to claim 1, wherein the first and second ornamental layers each have a thickness of 50 to 200 nm.

3. The ornament according to claim 1, wherein the first ornamental layer and the second ornamental layer differ from each other in at least one of material, number of layers, thickness, refractive index of visible light, reflectance of visible light, absorptivity of visible light, and transmittance of visible light.

4. The ornament according to claim 1, wherein the first ornamental layer has a light transmittance for visible light that is less than that of the second ornamental layer.

5. The ornament according to claim 1, wherein the first ornamental layer is formed by applying a hard coating agent on the surface of the base material.

6. The ornament according to claim 1, wherein the second ornamental layer is formed by alternately superimposing thin films of different types of metals.

7. The ornament according to claim 1, wherein the base material is acrylic resin.

8. The ornament according to claim 1, wherein the visible light is influenced by at least one effect selected from refraction, reflection, and interference in the first ornamental layer and influenced by at least one effect selected from refraction, reflection, and interference in the second ornamental layer.

9. The ornament according to claim 1 wherein the ornament is for a radiator grille.

10. The ornament according to claim 1, wherein the ornament provides a metallic gloss reflection when irradiated with visible light by a combination of optical properties of and arrangements between the base material and the first and second ornamental layers.

11. The ornament according to claim 10, wherein the metallic gloss reflection inhibits viewing structures behind the ornament from in front of the ornament.

12. An ornament, which is a component attached to the outer side of a vehicle an which inhibits viewing of structures behind the ornament from in front of the ornament, the ornament comprising:
 a base material which transmits visible light and is made of a synthetic resin;
 a first ornamental layer coating a front surface of the base material, the first ornamental layer transmitting visible light and having a thickness less than 800 nm; and
 a second ornamental layer coating a rear surface of the base material, the second ornamental layer transmitting visible light and having a thickness less than 800 nm, wherein
 the base material and first and second ornamental layers have optical properties and are arranged to provide a metallic gloss reflection when the ornament is irradiated with visible light,
 the second ornamental layer is formed by dichroic vapor deposition or half mirror vapor deposition.
 an Abbe constant of the ornament is 60 or less, and
 the Abbe constant indicates the degree of color aberration resulting from the dispersion of light.

13. The ornament according to claim 12, wherein the first and second ornamental layers each have a thickness of 50 to 200 nm.

14. The ornament according to claim 12, wherein the first ornamental layer and the second ornamental layer differ from each other in at least one of material, number of layers, thickness, refractive index of visible light, reflectance of visible light, absorptivity of visible light, and transmittance of visible light.

15. The ornament according to claim 12, wherein the first ornamental layer has a light transmittance for visible light that is less than that of the second ornamental layer.

16. The ornament according to claim 12, wherein the first ornamental layer is formed by applying a hard coating agent on the surface of the base material.

17. The ornament according to claim 12, wherein the second ornamental layer is formed by alternately superimposing thin films of different types of metals.

18. The ornament according to claim 12, wherein the metallic gloss reflection inhibits viewing structures behind the ornament from in front of the ornament,

* * * * *